United States Patent
Ha et al.

(10) Patent No.: US 6,661,282 B2
(45) Date of Patent: Dec. 9, 2003

(54) DEMODULATION APPARATUS AND METHOD IN A COMMUNICATION SYSTEM EMPLOYING 16-ARY QAM

(75) Inventors: Sang-Hyuck Ha, Suwon-shi (KR); Min-Goo Kim, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/217,963

(22) Filed: Aug. 13, 2002

(65) Prior Publication Data

US 2003/0102905 A1 Jun. 5, 2003

(30) Foreign Application Priority Data

Aug. 13, 2001 (KR) ......................................... 2001-48758

(51) Int. Cl.[7] .................................................. H03D 3/00
(52) U.S. Cl. ........................ 329/304; 375/261; 375/262
(58) Field of Search ................................. 329/304, 305, 329/306; 375/260, 261, 262, 340, 341

(56) References Cited

U.S. PATENT DOCUMENTS

| | | | |
|---|---|---|---|
| 5,544,328 A | * | 8/1996 | Seshadri ...................... 375/261 |
| 5,774,500 A | * | 6/1998 | Zogakis et al. .............. 375/261 |
| 6,424,685 B1 | * | 7/2002 | Messel et al. ............... 375/341 |

* cited by examiner

*Primary Examiner*—Timothy P. Callahan
*Assistant Examiner*—An T. Luu
(74) *Attorney, Agent, or Firm*—Dilworth & Barrese, LLP (57) ABSTRACT

Disclosed is a 16-ary QAM (Quadrature Amplitude Modulation) demodulation apparatus for receiving an input signal $R_k(X_k, Y_k)$ comprised of a $k^{th}$ quadrature-phase component $Y_k$ and a $k^{th}$ in-phase component $X_k$, and generating soft values $\Lambda(s_{k,0})$, $\Lambda(s_{k,1})$, $\Lambda(s_{k,2})$ and $\Lambda(s_{k,3})$ for the input signal $R_k(X_k, Y_k)$ by a soft decision means. A first calculator decides a soft value $\Lambda(s_{k,2})$ of a third demodulated symbol among 4 demodulated symbols by subtracting a distance $2a$ between two demodulated symbols on the same axis of a mapping table from a level $|Y_k|$ of the quadrature-phase component $Y_k$. A second calculator decides a soft value $\Lambda(s_{k,3})$ of a fourth demodulated symbol by calculating $Y_k + \alpha * Z_k$ using a first variable $\alpha$ determined by the soft value of the third demodulated symbol and a sign bit of the quadrature-phase component $Y_k$. A third calculator decides a soft value $\Lambda(s_{k,0})$ of a first demodulated symbol by subtracting the distance $2a$ from a level $|X_k|$ of the in-phase component $X_k$. A fourth calculator decides a soft value $\Lambda(s_{k,1})$ of a second demodulated symbol by calculating $X_k + \beta * Z'_k$ using a second variable $\beta$ determined by the soft value of the first demodulated symbol and a sign bit of the in-phase component $X_k$.

13 Claims, 4 Drawing Sheets

DEMODULATION APPARATUS AND METHOD IN A COMMUNICATION SYSTEM EMPLOYING 16-ARY QAM

PRIORITY

This application claims priority to an application entitled "Demodulation Apparatus and Method in a Communication System Employing Multi-Level Modulation" filed in the Korean Industrial Property Office on Aug. 13, 2001 and assigned Serial No. 2001-48758, the contents of which are herein incorporated by reference.

BACKGROUND OF THE INVENTION

1. Field of the Invention

The present invention relates generally to a demodulation apparatus and method in a communication system employing multi-level modulation, and in particular, to an apparatus and method for calculating input soft values of a channel decoder in a demodulator for a communication system employing 16-ary QAM (Quadrature Amplitude Modulation).

2. Description of the Related Art

In a data communication system, when a signal encoded by a channel encoder is modulated using 16-ary QAM, a typical multi-level modulation used to increase spectral efficiency, a demodulator in a receiver requires a mapping algorithm for generating soft values (or soft decision values) corresponding to output bits of the channel encoder from a 2-dimensional signal comprised of an in-phase signal component and a quadrature-phase signal component, in order for a channel decoder in the receiver to decode the modulated signal through soft decision decoding.

The mapping algorithm is classified into a simple metric procedure proposed by Nokia and a dual minimum metric procedure proposed by Motorola, and both algorithms calculate LLR (Log Likelihood Ratio) for the output bits and use the calculated LLR as an input soft value of the channel decoder.

The simple metric procedure, a mapping algorithm given by modifying a complex LLR calculation formula into a simple approximate formula, has a simple LLR calculation formula, but LLR distortion caused by the use of the approximate formula leads to performance degradation. The dual minimum metric procedure, a mapping algorithm of calculating LLR with a more accurate approximate formula and using the calculated LLR as an input soft value of the channel decoder, can make up for performance degradation of the simple metric procedure to some extent. However, compared with the simple metric procedure, this procedure needs increased calculations, thus causing a considerable increase in hardware complexity.

SUMMARY OF THE INVENTION

It is, therefore, an object of the present invention to provide an apparatus and method for simplifying obtaining of input soft values of a channel decoder, calculated by the dual minimum metric procedure, without a mapping table or complex processing needed to obtain a minimum distance value with a received signal in a demodulator for a communication system employing 16-ary QAM.

To achieve the above and other objects, there is provided a method for demodulating a received signal in a data communication system employing a modulation technique for dividing an output sequence of a channel encoder into 4 bits and mapping the bits to a specific one of 16 signal points having an in-phase component $X_k$ and a quadrature-phase component $Y_k$. The method comprises deciding a soft value $Z_k$ of a third demodulated symbol by subtracting a distance 2a between two demodulated symbols on the same axis of a mapping table from a level $|Y_k|$ of the quadrature-phase component $Y_k$; setting a first variable $\alpha$ to "0" if the soft value $Z_k$ has a negative value, setting the first variable $\alpha$ to "−1" if the $Z_k$ has a positive value and the quadrature-phase component $Y_k$ has a negative value, and setting the first variable $\alpha$ to "1" if the $Z_k$ has a positive value and the quadrature-phase component $Y_k$ has a positive value; determining a soft value of a fourth demodulated symbol by calculating $Y_k+\alpha^*Z_k$ using the quadrature-phase component $Y_k$, the soft value $Z_k$ and the first variable $\alpha$; calculating a soft value $Z'_k$ of a first demodulated symbol by subtracting the distance 2a between two demodulated symbols on the same axis of a mapping table from a level $|X_k|$ of the in-phase component $X_k$; setting a second variable $\beta$ to "0" if the soft value $Z'_k$ has a negative value, setting the second variable $\beta$ to "−1" if the $Z'_k$ has a positive value and the in-phase component $X_k$ has a negative value, and setting the second variable $\beta$ to "1" if the $Z'_k$ has a positive value and the in-phase component $X_k$ has a positive value; and determining a soft value of a second demodulated symbol by calculating $X_k+\beta^*Z'_k$ using the in-phase component $X_k$, the soft value $Z'_k$ and the second variable $\beta$.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention provides a method for obtaining an input soft value of a channel decoder, calculated by the dual minimum metric procedure, without a mapping table or complex calculations in a demodulator for a data communication system employing 16-ary QAM.

An algorithm for generating multi-dimensional soft values from a 2-dimentional received signal will be described herein below. An output sequence of a binary channel encoder is divided into m bits, and mapped to corresponding signal points among M ($=2^m$) signal points according to a Gray coding rule. This can be represented by Equation (1)

$$s_{k,m-1}s_{k,m-2}\ldots s_{k,0} \rightarrow I_k, Q_k$$

Figure 1:
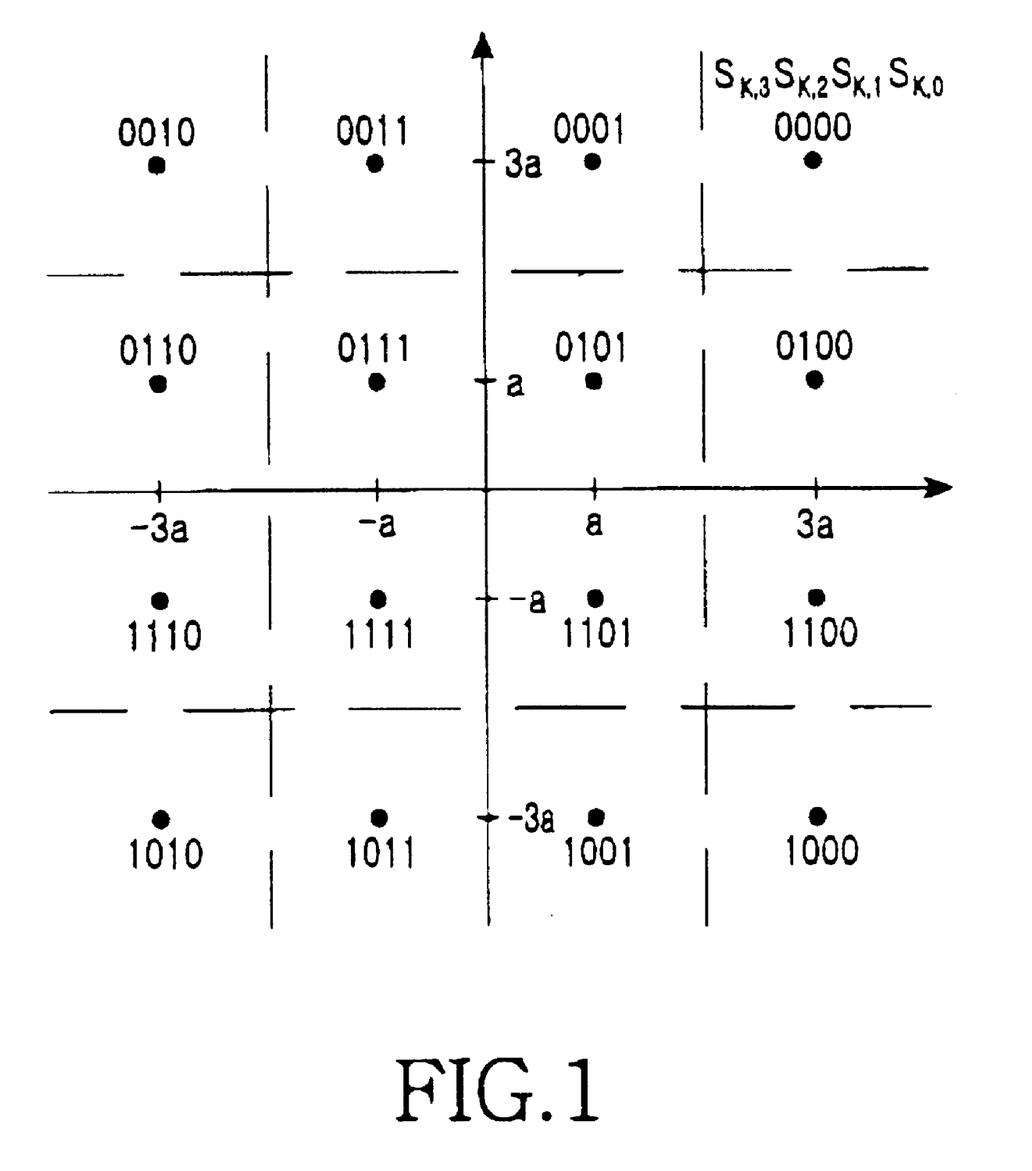
FIG. 1 illustrates a signal constellation diagram for 16-ary QAM.

In Equation (1), $S_{k,i}$ (i=0,1, . . . ,m−1) indicates an $i^{th}$ bit in the output sequence of the binary channel encoder, mapped to a $k^{th}$ symbol, and $I_k$ and $Q_k$ indicate an in-phase signal component and a quadrature-phase signal component of the $k_{th}$ symbol, respectively. For 16-ary QAM, m=4 and a corresponding signal constellation is illustrated in FIG. 1. As illustrated, the signal constellation is comprised of 16 signal points, and each quadrant is comprised of 4 signal points. Each signal point is expressed with 4 symbols. For example, in FIG. 1, a first quadrant is divided into 4 regions; a right top region is mapped to a symbol stream "0000", a right bottom region is mapped to a symbol stream "0100", a left top region is mapped to "0001", and a left bottom region is mapped to a symbol stream "0101".

A complex output of a symbol demodulator in the receiver, comprised of $I_k$ component and $Q_k$ component, is defined as Equation (2)

$$R_k \equiv X_k + jY_k = g_k(I_k + jQ_k) + (\eta_k^I + j\eta_k^Q)$$

In Equation (2), $X_k$ and $Y_k$ indicate an in-phase signal component and a quadrature-phase signal component of the output of the symbol demodulator, respectively. Further, $g_k$ is a complex coefficient indicating gains of the transmitter, transmission media and the receiver. In addition, $\eta_k^I$ and $\eta_k^Q$ are Gaussian noises with an average 0 and a divergence $\sigma_n^2$, and they are statistically independent of each other.

The LLR related to the sequence $s_{k,1}$ (i=0,1, . . . ,m−1) can be calculated by Equation (3), and the calculated LLR can be used as a soft value input to the channel decoder.

$$\Lambda(S_{k,i}) = K\log\frac{Pr\{S_{k,i}=0 \mid X_k, Y_k\}}{Pr\{S_{k,i}=1 \mid X_k, Y_k\}} \quad i=0,1,\ldots,m-1, \quad \text{Equation (3)}$$

In Equation (3), $\Lambda(s_{k,i})$ is the soft value, K is a constant, and Pr{A|B} indicates a conditional probability defined as a probability that an event A will occur when an event B occurs. However, since Equation (3) is non-linear and accompanies relatively many calculations, an algorithm capable of approximating Equation (3) is required for actual realization. In the case of a Gaussian noise channel with $g_k=1$ in Equation (2), Equation (3) can be approximated by the dual minimum metric procedure as follows.

$$\Lambda(s_{k,i}) = K\log\frac{\sum_{z_k}\exp\left\{-\frac{1}{\sigma_\eta^2}|R_k - z_k(s_{k,i}=0)|^2\right\}}{\sum_{z_k}\exp\left\{-\frac{1}{\sigma_\eta^2}|R_k - z_k(s_{k,i}=1)|^2\right\}} \quad \text{Equation (4)}$$

$$\approx K\log\frac{\exp\left\{-\frac{1}{\sigma_\eta^2}\min|R_k - z_k(s_{k,i}=0)|^2\right\}}{\exp\left\{-\frac{1}{\sigma_\eta^2}\min|R_k - z_k(s_{k,i}=1)|^2\right\}}$$

$$= K'[\min|R_k - z_k(s_{k,i}=1)|^2 - \min|R_k - z_k(s_{k,i}=0)|^2]$$

In Equation (4), $K'=(1/\sigma_n^2)K$, and $Z_k(S_{k,i}=0)$ and $Z_k(S_{k,i}=1)$ indicate actual values of $I_k+jQ_k$ for $S_{k,i}=0$ and $S_{k,i}=1$, respectively. In order to calculate Equation (4), it is necessary to determine $z_k(s_{k,i}=0)$ and $z_k(s_{k,i}=1)$ by minimizing $|R_k-z_k(S_{k,i}=0)|^2$ and $|R_k-z_k(S_{k,i}=1)|^2$, for a 2-dimensional received signal $R_k$.

Equation (4) approximated by the dual minimum metric procedure can be rewritten as Equation (5)

$$\Lambda(s_{k,i}) = K'[\min|R_k-z_k(s_{k,i}=1)|^2 - \min|R_k-z_k(s_{k,i}=0)|^2] = K'(2n_{k,i}-1)[|R_k-z_k(s_{k,i}=n_{k,i})|^2 - \min|R_k-z_k(s_{k,i}=\bar{n}_{k,i})|^2]$$

In Equation (5), $n_{k,i}$ indicates an $i^{th}$ bit value of a demapping sequence for a signal point nearest to $R_k$, and $\bar{n}_{k,i}$ indicates a negation for $n_{k,i}$. The nearest signal point is determined by ranges of an in-phase signal component value and a quadrature-phase signal component value of $R_k$. A first term in the brackets of Equation (5) can be written as Equation (6)

$$|R_k-z_k(s_{k,i}=n_{k,i})|^2 = (X_k-U_k)^2 + (Y_k-V_k)^2$$

In Equation (6), $U_k$ and $V_k$ denote an in-phase signal component and a quadrature-phase signal component of a signal point mapped by $\{n_{k,m-1}, \ldots, n_{k,i}, \ldots, n_{k,1}, n_{k,0}\}$, respectively.

Further, a second term in the brackets of Equation (5) can be written as

Equation (7)

$$\min|R_k-z_k(s_{k,i}=\bar{n}_{k,i})|^2 = (X_k-U_{k,i})^2 + (Y_k-V_{k,i})^2$$

In Equation (7), $U_{k,i}$ and $V_{k,i}$ denote an in-phase signal component and a quadrature-phase signal component of a signal point mapped by a demapping sequence $\{m_{k,m-1}, \ldots, m_{k,i}(=\bar{n}_{k,i}), \ldots, m_{k,1}, m_{k,0}\}$ of $Z_k$ minimizing $|R_k-z_k(s_{k,i}=\bar{n}_{k,i})|^2$, respectively. Equation (5) is rewritten as Equation (8) by Equation (6) and Equation (7).

$$\Lambda(s_{k,i}) = K'(2n_{k,i}-1)[\{(X_k-U_k)^2 + (Y_k-V_k)^2\} - \{(X_k-U_{k,i})^2 + (Y_k-V_{k,i})^2\}] \quad \text{Equation (8)}$$

$$= K'(2n_{k,i}-1)[(U_k+U_{k,i}-2X_k)(U_k-U_{k,i}) + (V_k+V_{k,i}-2Y_k)(V_k-V_{k,i})]$$

A process of calculating input soft values to the channel decoder by a demodulator in a data communication system employing 16-ary QAM will be described herein below. First, Table (1) and Table (2) are used to calculate $\{n_{k,3}, n_{k,2}, n_{k,1}, n_{k,0}\}$, $U_k$ and $V_k$ from two signal components $X_k$ and $Y_k$ of a 16-ary QAM-modulated received signal $R_k$. Table 1 illustrates ($n_{k,3}, n_{k,2}$) and $V_k$ for the case where a quadrature-phase signal component $Y_k$ of the received signal $R_k$ appears in each of 4 regions parallel to a horizontal axis in FIG. 1. For the sake of convenience, 3 boundary values, i.e., result values at $Y_k=-2a$, $Y_k=0$ and $Y_k=2a$ are omitted from Table 1. Table 2 illustrates ($n_{k,1}, n_{k,0}$) and $U_k$ for the case where an in-phase signal component $X_k$ of the received signal $R_k$ appears in each of 4 regions parallel to a vertical axis in FIG. 1. For the sake of convenience, 3 boundary values, i.e., result values at $X_k=-2a$, $X_k=0$ and $X_k=2a$ are omitted from Table 2.

TABLE 1

| Condition of $Y_k$ | ($n_{k,3}, n_{k,2}$) | $V_k$ |
|---|---|---|
| $Y_k > 2a$ | (0, 0) | 3a |
| $0 < Y_k < 2a$ | (0, 1) | a |

TABLE 1-continued

| Condition of $Y_k$ | $(n_{k,3}, n_{k,2})$ | $V_k$ |
|---|---|---|
| $-2a < Y_k < 0$ | (1, 1) | $-a$ |
| $Y_k < -2a$ | (1, 0) | $-3a$ |

TABLE 2

| Condition of $X_k$ | $(n_{k,1}, n_{k,0})$ | $U_k$ |
|---|---|---|
| $X_k > 2a$ | (0, 0) | $3a$ |
| $0 < X_k < 2a$ | (0, 1) | $a$ |
| $-2a < X_k < 0$ | (1, 1) | $-a$ |
| $X_k < -2a$ | (1, 0) | $-3a$ |

Table 3 illustrates a sequence $\{m_{k,3}, m_{k,2}, m_{k,1}, m_{k,0}\}$ minimizing $|R_k - z_k(s_{k,i} = \bar{n}_{k,i})|^2$, calculated for i (where i∈{0, 1, 2, 3}), in terms of a function $\{n_{k,3}, n_{k,2}, n_{k,1}, n_{k,0}\}$, and also shows in-phase and quadrature-phase signal components $U_{k,i}$ and $V_{k,i}$ of the corresponding $Z_k$.

TABLE 3

| i | $\{m_{k,3}, m_{k,2}, m_{k,1}, m_{k,0}\}$ | $V_{k,i}$ | $U_{k,i}$ |
|---|---|---|---|
| 3 | $\{\underline{n_{k,3}}, \underline{1}, n_{k,1}, n_{k,0}\}$ | $V_{k,3}$ | $U_k$ |
| 2 | $\{n_{k,3}, \underline{n_{k,2}}, n_{k,1}, n_{k,0}\}$ | $V_{k,2}$ | $U_k$ |
| 1 | $\{n_{k,3}, n_{k,2}, \underline{n_{k,1}}, \underline{1}\}$ | $V_k$ | $U_{k,1}$ |
| 0 | $\{n_{k,3}, n_{k,2}, n_{k,1}, \underline{n_{k,0}}\}$ | $V_k$ | $U_{k,0}$ |

Table 4 and Table 5 illustrate $V_{k,i}$ and $U_{k,i}$ corresponding to $(m_{k,3}, m_{k,2})$ and $(m_{k,1}, m_{k,0})$ calculated in Table 3, for all combinations of $(n_{k,3}, n_{k,2})$ and $(n_{k,1}, n_{k,0})$.

TABLE 4

| $(n_{k,3}, n_{k,2})$ | $V_{k,3}$ | $V_{k,2}$ |
|---|---|---|
| (0, 0) | $-a$ | $a$ |
| (0, 1) | $-a$ | $3a$ |
| (1, 1) | $a$ | $-3a$ |
| (1, 0) | $a$ | $-a$ |

TABLE 5

| $(n_{k,1}, n_{k,0})$ | $U_{k,1}$ | $U_{k,0}$ |
|---|---|---|
| (0, 0) | $-a$ | $a$ |
| (0, 1) | $-a$ | $3a$ |
| (1, 1) | $a$ | $-3a$ |
| (1, 0) | $a$ | $-a$ |

Table 6 and Table 7 illustrate results given by down-scaling, in a ratio of K'×4a, input soft values of the channel decoder obtained by substituting $V_{k,i}$ and $U_{k,i}$ of Table 4 and Table 5 into Equation (8). That is, when a received signal $R_k$ is applied, LLR satisfying a corresponding condition can be output as an input soft value by Table 6 and Table 7. If the channel decoder used in the system is not a max-logMAP (logarithmic maximum a posteriori) decoder, a process of up-scaling the LLR of Table 6 and Table 7 in a reverse ratio of the down-scale ratio must be added.

TABLE 6

| Condition of $Y_k$ | $\Lambda(s_{k,3})$ | $\Lambda(s_{k,2})$ |
|---|---|---|
| $Y_k > 2a$ | $2Y_k - 2a$ | $Y_k - 2a$ |
| $0 < Y_k < 2a$ | $Y_k$ | $Y_k - 2a$ |

TABLE 6-continued

| Condition of $Y_k$ | $\Lambda(s_{k,3})$ | $\Lambda(s_{k,2})$ |
|---|---|---|
| $-2a < Y_k < 0$ | $Y_k$ | $-Y_k - 2a$ |
| $Y_k < -2a$ | $2Y_k + 2a$ | $-Y_k - 2a$ |

TABLE 7

| Condition of $X_k$ | $\Lambda(s_{k,1})$ | $\Lambda(s_{k,0})$ |
|---|---|---|
| $X_k > 2a$ | $2X_k - 2a$ | $X_k - 2a$ |
| $0 < X_k < 2a$ | $X_k$ | $X_k - 2a$ |
| $-2a < X_k < 0$ | $X_k$ | $-X_k - 2a$ |
| $X_k < -2a$ | $2X_k + 2a$ | $-X_k - 2a$ |

However, when outputting an input soft value of the channel decoder using the mapping table of Table 6 or Table 7, the demodulator should disadvantageously perform an operation of deciding a condition of the received signal and require a memory for storing the output contents according to the corresponding condition. Such disadvantages can be overcome by calculating the input soft values to the channel decoder using a formula having a simple condition decision operation instead of the mapping table.

To this end, the condition decision formulas shown in Table 6 and Table 7 can be expressed as shown in Table 8 and Table 9. In Table 8, $Z_k = |Y_k| - 2a$, and in Table 9, $Z'_k = |X_k| - 2a$. In Table 8 and Table 9, even the soft values at the 3 boundary values, which were omitted from Table 6 and Table 8 for convenience, are taken into consideration.

TABLE 8

| Condition of $Y_k$ | Condition of $Z_k$ | $\Lambda(s_{k,3})$ | $\Lambda(s_{k,2})$ |
|---|---|---|---|
| $Y_k \geq 0$ | $z_k \geq 0$ | $Y_k + (Y_k - 2a)$ | $Y_k - 2a$ |
|  | $z_k < 0$ | $Y_k$ | $Y_k - 2a$ |
| $Y_k < 0$ | $z_k \geq 0$ | $Y_k - (-Y_k - 2a)$ | $-Y_k - 2a$ |
|  | $z_k < 0$ | $Y_k$ | $-Y_k - 2a$ |

TABLE 9

| Condition of $X_k$ | Condition of $Z'_k$ | $\Lambda(s_{k,1})$ | $\Lambda(s_{k,0})$ |
|---|---|---|---|
| $X_k \geq 0$ | $z'_k \geq 0$ | $X_k + (X_k - 2a)$ | $X_k - 2a$ |
|  | $z'_k < 0$ | $X_k$ | $X_k - 2a$ |
| $X_k < 0$ | $z'_k \geq 0$ | $X_k - (-X_k - 2a)$ | $-X_k - 2a$ |
|  | $z'_k < 0$ | $X_k$ | $-X_k - 2a$ |

In hardware realization, Table 8 and Table 9 can be simplified into Table 10 and Table 11 on condition that a sign of $X_k, Y_k, Z_k, Z'_k$ can be expressed by sign bits. In Table 10 and Table 11, MSB(x) denotes a most significant bit (MSB) of a given value x.

TABLE 10

| MSB($Y_k$) | MSB($Z_k$) | $\Lambda(s_{k,3})$ | $\Lambda(s_{k,2})$ |
|---|---|---|---|
| 0 | 0 | $Y_k + Z_k$ | $Z_k$ |
|  | 1 | $Y_k$ | $Z_k$ |
| 1 | 0 | $Y_k - Z_k$ | $Z_k$ |
|  | 1 | $Y_k$ | $Z_k$ |

TABLE 11

| MSB($X_k$) | MSB($Z'_k$) | $\Lambda(s_{k,1})$ | $\Lambda(s_{k,0})$ |
|---|---|---|---|
| 0 | 0 | $X_k + Z'_k$ | $Z'_k$ |
| 0 | 1 | $X_k$ | $Z'_k$ |
| 1 | 0 | $X_k - Z'_k$ | $Z'_k$ |
| 1 | 1 | $X_k$ | $Z'_k$ |

From Table 10, soft values $\Lambda(s_{k,3})$ and $\Lambda(s_{k,2})$ at i=3 and i=2 are expressed as $$\Lambda(s_{k,3}) = Y_k + \alpha \cdot Z_k, \text{ where} \qquad \text{Equation (9)}$$

$$\alpha = \begin{cases} 0 & \text{if } MSB(Z_k) = 1 \\ -1 & \text{if } MSB(Z_k) = 0 \text{ and } MSB(Y_k) = 1 \\ 1 & \text{if } MSB(Z_k) = 0 \text{ and } MSB(Y_k) = 0 \end{cases}$$

$$\Lambda(s_{k,2}) = Z_k$$

From Table 11, soft values $\Lambda(s_{k,1})$ and $\Lambda(s_{k,0})$ at i=1 and i=0 are expressed as $$\Lambda(s_{k,1}) = X_k + \beta \cdot Z'_k, \text{ where} \qquad \text{Equation (10)}$$

$$\beta = \begin{cases} 0 & \text{if } MSB(Z'_k) = 1 \\ -1 & \text{if } MSB(Z'_k) = 0 \text{ and } MSB(X_k) = 1 \\ 1 & \text{if } MSB(Z'_k) = 0 \text{ and } MSB(X_k) = 0 \end{cases}$$

$$\Lambda(s_{k,0}) = Z'_k$$

That is, in the data communication system employing 16-ary QAM, it is possible to actually calculate 4 soft values, which are outputs of the demodulator for one received signal or inputs of the channel decoder, using the dual minimum metric procedure of Equation (4), through the simple conditional formulas of Equation (9) and Equation (10). This process is illustrated in FIG. 2.

Figure 2:
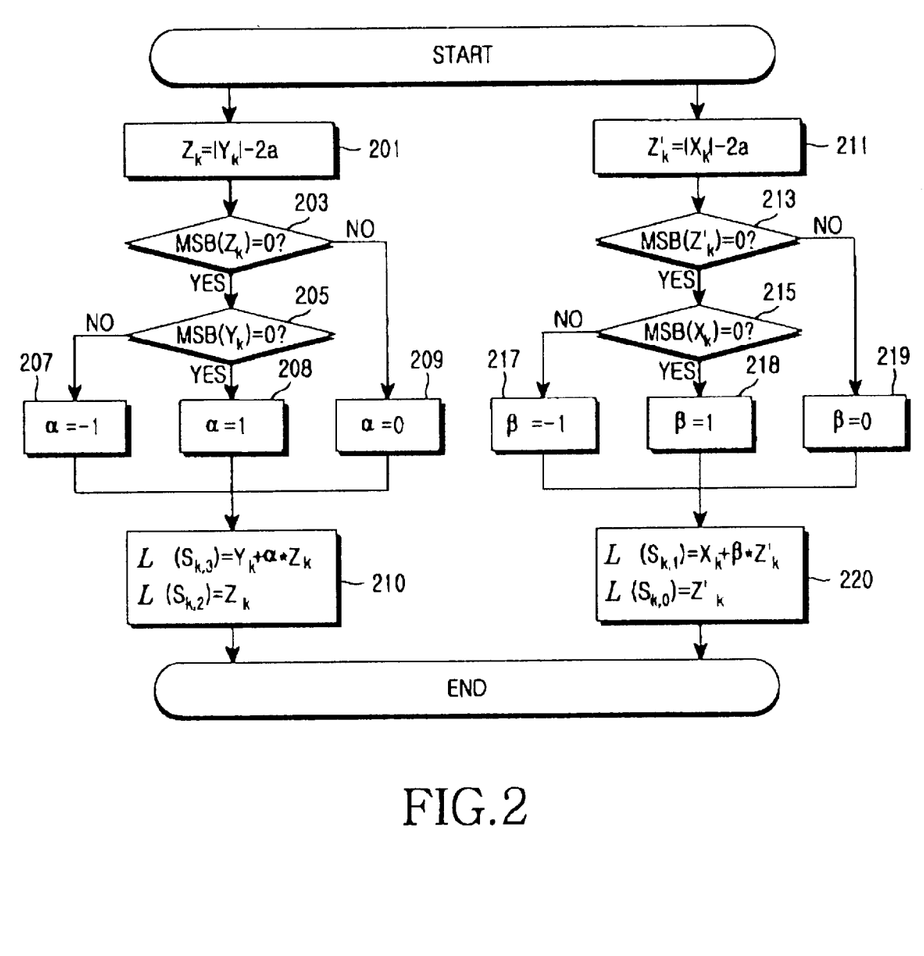
FIG. 2 illustrates a procedure for deciding soft values of 4 demodulated symbols input to a channel decoder in a data communication system employing 16-ary QAM according to an embodiment of the present invention.

FIG. 2 illustrates a procedure for deciding soft values of 4 demodulated symbols input to a channel decoder in a data communication system employing 16-ary QAM according to an embodiment of the present invention. In FIG. 2, a process of deciding a soft value by the dual minimum metric procedure can be divided into a first step of deciding a by analyzing a quadrature-phase signal and a value "a", and deciding β by analyzing an in-phase signal and the value "a", and a second step of outputting a soft value determined by the α and β values decided in the first step. An operation described below can be performed, for example, by a symbol demodulator of the receiver.

Referring to FIG. 2, in step 201, the symbol demodulator calculates $Z_k = |Y_k| - 2a$ using a 2-dimensional received signal $R_k$ comprised of an in-phase component $X_k$ and a quadrature-phase component $Y_k$, and a distance 2a between two demodulated symbols on the same axis of the mapping table. Here, $Z_k$, $Y_k$, $X_k$ and "a" are real numbers. The symbol demodulator determines in step 203 whether a result value calculated by the above formula has a positive value. For example, $Z_k$, $Y_k$, $X_k$ and "a" are expressed with a digital value including a sign bit. Therefore, in step 203, the symbol demodulator determines whether MSB (or sign bit) of the result value is "0." If the MSB is "0", i.e., the result value has a positive value, the symbol demodulator proceeds to step 205. Otherwise, the symbol demodulator proceeds to step 209, where it sets a variable α to "0." In step 205, the symbol demodulator determines whether the quadrature-phase component $Y_k$ has a positive value, i.e., determines whether MSB of the $Y_k$ is "0." If the $Y_k$ has a positive value, the symbol demodulator sets the variable α to "1" in step 208. Otherwise, the symbol demodulator sets the variable α to "−1" in step 207. Thereafter, in step 210, the symbol demodulator decides a fourth demodulated symbol $s_{k,3}$ among the demodulated symbols corresponding to the received signal $R_k$, using $Y_k + \alpha^* Z_k$, and decides a third symbol $s_{k,2}$ using $Z_k$, thereby deciding an input soft value to the channel decoder.

Hitherto, the procedure for deciding soft values for the fourth and third demodulated symbols using the quadrature-phase component has been described. Next, a procedure for deciding soft values for second and first demodulated symbols using the in-phase component will be described in detail herein below.

In step 211, the symbol demodulator calculates $Z'_k = |X_k| - 2a$ using a 2-dimensional received signal $R_k$ comprised of an in-phase component $X_k$ and a quadrature-phase component $Y_k$, and a distance 2a between two demodulated symbols on the same axis of the mapping table. The symbol demodulator determines in step 213 whether a result value calculated by the above formula has a positive value, i.e., determines whether MSB (or sign bit) of the result value is "0." If the result value has a positive value, the symbol demodulator proceeds to step 215. Otherwise, the symbol demodulator proceeds to step 219, where it sets a variable β to "0." In step 215, the symbol demodulator determines whether the in-phase component $X_k$ has a positive value, i.e., determines whether MSB of the $X_k$ is "0." If the $X_k$ has a positive value, the symbol demodulator sets the variable β to "1" in step 218. Otherwise, the symbol demodulator sets the variable β to "−1" in step 217. Thereafter, in step 220, the symbol demodulator decides a second demodulated symbol $S_{k,1}$ among the demodulated symbols corresponding to the received signal $R_k$, using $X_k + \alpha^* Z'_k$, and decides a first symbol $S_{k,0}$ using $Z'_k$, thereby deciding an input soft value of the channel decoder. The procedure for deciding the fourth and third demodulated symbols and the procedure for deciding the second and first demodulated symbols can be performed either sequentially or simultaneously. The decided soft values of the demodulated symbols are provided to the channel decoder.

Figure 3:
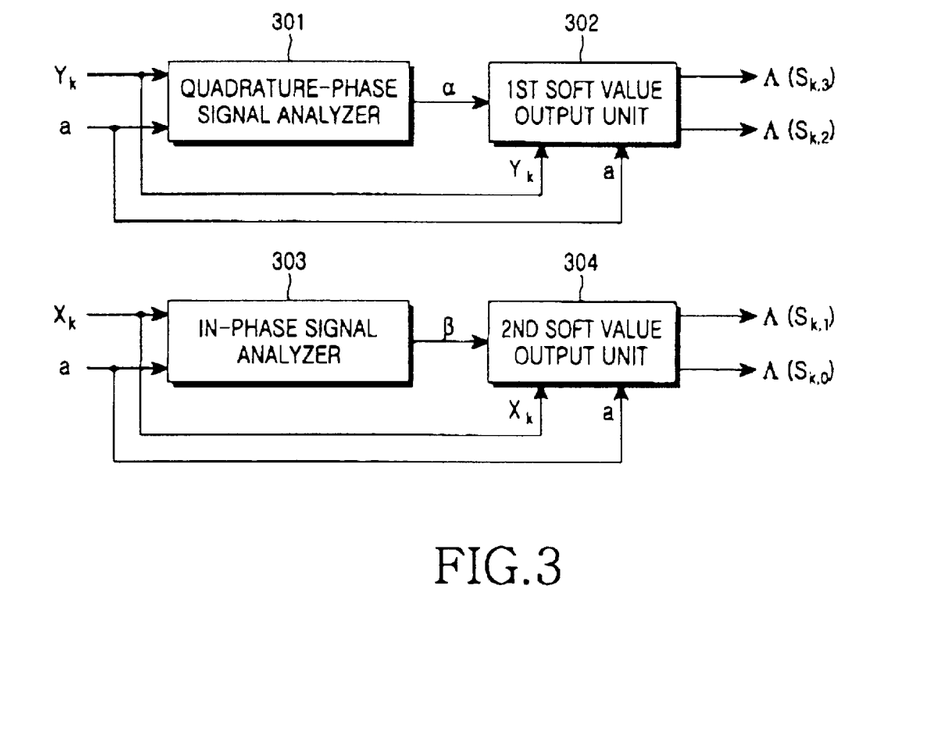
FIG. 3 illustrates a function block of performing the procedure for deciding soft values of demodulated symbols according to an embodiment of the present invention.

FIG. 3 illustrates a function block of performing the procedure for deciding soft values of demodulated symbols according to an embodiment of the present invention. Referring to FIG. 3, a quadrature-phase signal analyzer 301 calculates α variable a using a quadrature-phase component $Y_k$ of a received signal $R_k$ and a distance 2a between two demodulated symbols on the same axis of the mapping table, according to a given rule. As stated above, the variable α is calculated based on a sign of $Z_k$ (=$|Y_k|$−2a) and a sign of the quadrature-phase component $Y_k$. A first soft value output unit 302 performs Equation (9) using the variable α from the quadrature-phase signal analyzer 301, the quadrature-phase component $Y_k$ and the distance 2a, and outputs soft values of the fourth and third demodulated symbols.

An in-phase signal analyzer 303 calculates a variable β using an in-phase component $X_k$ of a received signal $R_k$ and a distance 2a between two demodulated symbols on the same axis of the mapping table, according to a given rule. As stated above, the variable β is calculated based on a sign of $Z'_k$ (=$|X_k|$−2a) and a sign of the in-phase component $X_k$. A second soft value output unit 304 performs Equation (10) using the variable β from the in-phase signal analyzer 303, the in-phase component $X_k$ and the distance 2a, and outputs soft values of the second and first demodulated symbols.

Figure 4:
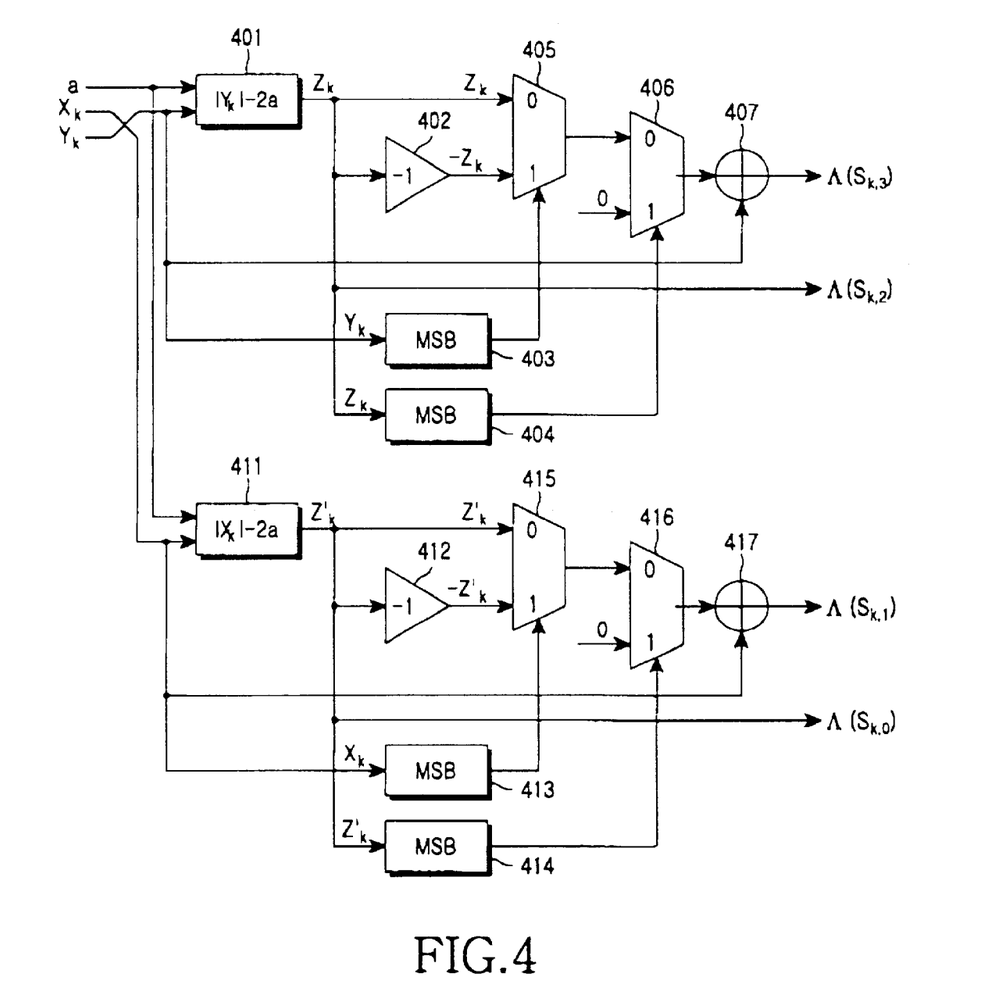
FIG. 4 illustrates a symbol demodulator for deciding input soft values of the channel decoder in a data communication system employing 16-ary QAM according to an embodiment of the present invention.

FIG. 4 illustrates a symbol demodulator for deciding input soft values of the channel decoder in a data communication system employing 16-ary QAM according to an embodiment of the present invention, wherein the symbol demodulator is realized by hardware based on Equation (9) and Equation (10). In the following description, the received signal $R_k$, the in-phase component $X_k$, the quadrature-phase component $Y_k$, the variable $Z_k$, the variable $Z'_k$, the variable $\alpha$, the variable $\beta$, and "a" are real numbers having a digital value including a sign bit.

Referring to FIG. 4, a first calculator 401 calculates $Z_k=|Y_k|-2a$ using a quadrature-phase component $Y_k$ of a received signal $R_k$ and a distance 2a between two demodulated symbols on the same axis of the mapping table, and outputs the value $Z_k$. A multiplier 402 multiplies the $Z_k$ from the first calculator 401 by "−1" thus to invert a sign of the $Z_k$. A first MSB extractor 403 extracts MSB of the quadrature-phase component $Y_k$ and provides it to a first selector 405, and a second MSB extractor 404 extracts MSB of the $Z_k$ from the first calculator 401 and provides it to a second selector 406. The first selector 405 receives the $Z_k$ from the first calculator 401 and the "$-Z_k$" from the first multiplier 402, and selects one of the two input values according to a select signal from the first MSB extractor 403. The second selector 406 receives an output the first selector 405 and "0," and selects one of the two input values according to a select signal from the second MSB extractor 404. A first adder 407 adds an output of the second selector 406 and the quadrature-phase component $Y_k$, and outputs a soft value of the fourth demodulated symbol. Further, the $Z_k$ value calculated by the first calculator 401 is decided as a soft value of the third demodulated symbol.

A second calculator 411 calculates $Z'_k=|X_k|-2a$ using an in-phase component $X_k$ of the received signal $R_k$ and the distance 2a between two demodulated symbols on the same axis of the mapping table, and outputs the value $Z'_k$. A multiplier 412 multiplies the $Z'_k$ from the second calculator 411 by "−1" thus to invert a sign of the $Z'_k$. A third MSB extractor 413 extracts MSB of the in-phase component $X_k$ and provides it to a third selector 415, and a fourth MSB extractor 414 extracts MSB of the $Z'_k$ from the second calculator 411 and provides it to a fourth selector 416. The third selector 415 receives the $Z'_k$ from the second calculator 411 and the "$-Z'_k$" from the second multiplier 412, and selects one of the two input values according to a select signal from the third MSB extractor 413. The fourth selector 416 receives an output the third selector 415 and "0," and selects one of the two input values according to a select signal from the fourth MSB extractor 414. A second adder 417 adds an output of the fourth selector 416 and the in-phase component $X_k$, and outputs a soft value of the second demodulated symbol. Further, the $Z'_k$ value calculated by the second calculator 411 is decided as a soft value of the first demodulated symbol.

Now, a comparison will be made between the conventional soft value decision and the novel soft value decision in terms of performance.

In the case where a soft value calculator using the dual minimum metric procedure is realized by Equation (4), the conventional soft value decision method expects several tens of squaring operations and comparison operations, whereas the novel symbol demodulator of FIG. 4 is comprised of 4 adders, 2 multipliers, and 4 multiplexers, contributing to a remarkable reduction in operation time and complexity of the demodulator. Table 12 below illustrates a comparison made between Equation (4) and Equations (9) and (10) in terms of the type and number of operations, for $i\in\{0, 1, 2, 3\}$.

TABLE 12

| Equation (4) | | Equations (9) and (10) | |
| --- | --- | --- | --- |
| Operation | No of Operations | Operation | No of Operations |
| Addition | 3 × 16 + 4 = 52 | Addition | 4 |
| Squaring | 2 × 16 = 32 | Multiplication | 2 |
| Comparison | 7 × 2 × 4 = 56 | Multiplexing | 4 |

In sum, the present invention derives Table 6 to Table 11 from Equation (6) to Equation (8) and the process of Table 1 to Table 5, in order to reduce a time delay and complexity, which may occur when Equation (4), the known dual minimum metric procedure, or Equation (5) obtained by simplifying the dual minimum metric procedure is actually realized using the 16-ary QAM. Further, the present invention provides Equation (9) and Equation (10), new formulas used to realize the dual minimum metric procedure in the 16-ary QAM. In addition, the present invention provides a hardware device realized based on Equation (9) and Equation (10).

As described above, in deriving a soft value (or soft decision value) needed as an input of a channel decoder using the dual minimum metric procedure, the novel 16-ary QAM demodulator for a data communication system can perform simple and rapid calculation while obtaining the same result as when the existing formula is used. A soft value calculator realized by hardware remarkably reduces an operation time and complexity of the demodulator.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A 16-ary QAM (Quadrature Amplitude Modulation) demodulation apparatus for receiving an input signal $R_k(X_k, Y_k)$ comprised of a $k^{th}$ quadrature-phase component $Y_k$ and a $k^{th}$ in-phase component $X_k$, and for generating soft values $\Lambda(s_{k,0})$, $\Lambda(s_{k,1})$, $\Lambda(s_{k,2})$ and $\Lambda(s_{k,3})$ for the input signal $R_k(X_k, Y_k)$ by a soft decision means, comprising:

a first soft value decider for deciding soft values $\Lambda(s_{k,0})$ and $\Lambda(s_{k,1})$ of first and second demodulated symbols among 4 demodulated symbols, according to the following equations, $$Z'_k = |X_k| - 2a$$

$$\Lambda(s_{k,1}) = X_k + \beta \cdot Z'_k, \text{ where } \beta = \begin{cases} 0 & \text{if } MSB(Z'_k) = 1 \\ -1 & \text{if } MSB(Z'_k) = 0 \text{ and } MSB(X_k) = 1 \\ 1 & \text{if } MSB(Z'_k) = 0 \text{ and } MSB(X_k) = 0 \end{cases}$$

$$\Lambda(s_{k,0}) = Z'_k$$

where $\Lambda(s_{k,0})$ denotes the soft value of the first demodulated symbol, $\Lambda(s_{k,1})$ denotes the soft value of the second demodulated symbol, MSB is the most significant bit or sign bit, and "2a" denotes a distance between two demodulated symbols on the same axis of a mapping table; and a second soft value decider for deciding soft values $\Lambda(s_{k,2})$ and $\Lambda(s_{k,3})$ of third and fourth demodulated symbols among the 4 demodulated symbols, according to the following equations, $$Z_k = |Y_k| - 2a$$

$$\Lambda(s_{k,3}) = Y_k + \alpha \cdot Z_k, \text{ where } \alpha = \begin{cases} 0 & \text{if } MSB(Z_k) = 1 \\ -1 & \text{if } MSB(Z_k) = 0 \text{ and } MSB(Y_k) = 1 \\ 1 & \text{if } MSB(Z_k) = 0 \text{ and } MSB(Y_k) = 0 \end{cases}$$

$$\Lambda(s_{k,2}) = Z_k$$

where $\Lambda(s_{k,2})$ denotes the soft value of the third demodulated symbol, $\Lambda(s_{k,3})$ denotes the soft value of the fourth demodulated symbol, and "2a" denotes the distance between two demodulated symbols on the same axis of a mapping table.

2. The 16-ary QAM demodulation apparatus of claim 1, wherein the first soft value decider comprises:
a first calculator for calculating $Z'_k=|X_k|-2a$ using the in-phase component $X_k$ and the distance 2a between two demodulated symbols on the same axis of a mapping table, and outputting the $Z'_k$ as the soft value of the first demodulated symbol;
a first selector for receiving the $Z'_k$ from the first calculator and an inverted signal of the $Z'_k$, and selecting one of the two inputs according to a sign bit of the in-phase component $X_k$;
a second selector for receiving an output of the first selector and a signal "0", and selecting one of the two inputs according to a sign bit of the $Z'_k$; and
a first adder for adding an output of the second selector and the in-phase component $X_k$, and outputting the soft value of the second demodulated symbol.

3. The 16-ary QAM demodulation apparatus of claim 1, wherein the second soft value decider comprises:
a second calculator for calculating $Z_k=|Y_k|-2a$ using the quadrature-phase component $Y_k$ and the distance 2a between two demodulated symbols on the same axis of a mapping table, and outputting the $Z_k$ as the soft value of the third demodulated symbol;
a third selector for receiving the $Z_k$ from the second calculator and an inverted signal of the $Z_k$, and selecting one of the two inputs according to a sign bit of the quadrature-phase component $Y_k$;
a fourth selector for receiving an output of the third selector and a signal "0", and selecting one of the two inputs according to a sign bit of the $Z_k$; and
a second adder for adding an output of the fourth selector and the quadrature-phase component $Y_k$, and outputting the soft value of the fourth demodulated symbol.

4. A 16-ary QAM (Quadrature Amplitude Modulation) demodulation apparatus for receiving an input signal $R_k(X_k, Y_k)$ comprised of a $k^{th}$ quadrature-phase component $Y_k$ and a $k^{th}$ in-phase component $X_k$, and generating soft values $\Lambda(s_{k,0}), \Lambda(s_{k,1}), \Lambda(s_{k,2})$ and $\Lambda(s_{k,3})$ for the input signal $R_k(X_k, Y_k)$ by a soft decision means, comprising:
a first calculator for determining a soft value $\Lambda(s_{k,2})$ of a third demodulated symbol among 4 demodulated symbols by subtracting a distance 2a between two demodulated symbols on the same axis of a mapping table from a level $|Y_k|$ of the quadrature-phase component $Y_k$;
a second calculator for determining a soft value $\Lambda(s_{k,3})$ of a fourth demodulated symbol by calculating $Y_k+\alpha^*Z_k$ using a first variable $\alpha$ determined by the soft value of the third demodulated symbol and a sign bit of the quadrature-phase component $Y_k$, where $Z_k$ is the soft value of the third demodulated symbol;
a third calculator for deciding a soft value $\Lambda(s_{k,0})$ of a first demodulated symbol by subtracting the distance 2a from a level $|X_k|$ of the in-phase component $X_k$; and
a fourth calculator for deciding a soft value $\Lambda(s_{k,1})$ of a second demodulated symbol by calculating $X_k+\beta^*Z'_k$ using a second variable $\beta$ determined by the soft value of the first demodulated symbol and a sign bit of the in-phase component $X_k$, where $Z'_k$ is the soft value of the first demodulated symbol.

5. The 16-ary QAM demodulation apparatus of claim 4, where the second calculator sets the first variable $\alpha$ to "0" if the soft value $Z_k$ of the third demodulated symbol has a negative value, sets the first variable $\alpha$ to "−1" if the $Z_k$ has a positive value and the quadrature-phase component $Y_k$ has a negative value, and sets the first variable $\alpha$ to "1" if the $Z_k$ has a positive value and the quadrature-phase component $Y_k$ has a positive value.

6. The 16-ary QAM demodulation apparatus of claim 4, wherein the fourth calculator sets the second variable $\beta$ to "0" if the soft value $Z'_k$ of the first demodulated symbol has a negative value, sets the second variable $\beta$ to "−1" if the $Z'_k$ has a positive value and the in-phase component $X_k$ has a negative value, and sets the second variable $\beta$ to "1" if the $Z'_k$ has a positive value and the in-phase component $X_k$ has a positive value.

7. A 16-ary QAM (Quadrature Amplitude Modulation) demodulation method for receiving an input signal $R_k(X_k, Y_k)$ comprised of a $k^{th}$ quadrature-phase component $Y_k$ and a $k^{th}$ in-phase component $X_k$, and generating soft values $\Lambda(s_{k,0}), \Lambda(s_{k,1}), \Lambda(s_{k,2})$ and $\Lambda(s_{k,3})$ for the input signal $R_k(X_k, Y_k)$ by a soft decision means, comprising the steps of:
calculating soft values $\Lambda(s_{k,0})$ and $\Lambda(s_{k,1})$ of first and second demodulated symbols among 4 demodulated symbols, using the following equations, $$Z'_k = |X_k| - 2a$$

$$\Lambda(s_{k,1}) = X_k + \beta \cdot Z'_k, \text{ where } \beta = \begin{cases} 0 & \text{if } MSB(Z'_k) = 1 \\ -1 & \text{if } MSB(Z'_k) = 0 \text{ and } MSB(X_k) = 1 \\ 1 & \text{if } MSB(Z'_k) = 0 \text{ and } MSB(X_k) = 0 \end{cases}$$

$$\Lambda(s_{k,0}) = Z'_k$$

where $\Lambda(s_{k,0})$ denotes the soft value of the first demodulated symbol, $\Lambda(s_{k,1})$ denotes the soft value of the second demodulated symbol, MSB is the most significant bit or sign bit, and "2a" denotes a distance between two demodulated symbols on the same axis of a mapping table; and
calculating soft values $\Lambda(s_{k,2})$ and $\Lambda(s_{k,3})$ of third and fourth demodulated symbols among the 4 demodulated symbols, using the following equations, $$Z_k = |Y_k| - 2a$$

$$\Lambda(s_{k,3}) = Y_k + \alpha \cdot Z_k, \text{ where } \alpha = \begin{cases} 0 & \text{if } MSB(Z_k) = 1 \\ -1 & \text{if } MSB(Z_k) = 0 \text{ and } MSB(Y_k) = 1 \\ 1 & \text{if } MSB(Z_k) = 0 \text{ and } MSB(Y_k) = 0 \end{cases}$$

$$\Lambda(s_{k,2}) = Z_k$$

where $\Lambda(s_{k,2})$ denotes the soft value of the third demodulated symbol, $\Lambda(s_{k,3})$ denotes the soft value of the fourth demodulated symbol, and "2a" denotes the distance between two demodulated symbols on the same axis of a mapping table.

8. The 16-ary QAM demodulation method of claim 7, wherein the first soft value decision step comprises the steps of:

calculating $Z'_k=|X_k|-2a$ using the in-phase component $X_k$ and the distance 2a between two demodulated symbols on the same axis of a mapping table, and outputting the calculated $Z'_k$ as the soft value of the first demodulated symbol;

selecting as a first selected signal one of the soft value $Z'_k$ of the first demodulated symbol and an inverted signal of the soft value $Z'_k$ of the first demodulated symbol, according to a sign bit of the in-phase component $X_k$;

selecting as a second selected signal one of the first selected signal and a signal "0", according to a sign bit of the soft value $Z'_k$ of the first demodulated symbol; and adding the second selected signal and the in-phase component $X_k$, and outputting the soft value of the second demodulated symbol.

9. The 16-ary QAM demodulation method of claim 7, wherein the second soft value decision step comprises the steps of:

calculating $Z_k=|Y_k|-2a$ using the quadrature-phase component $Y_k$ and the distance 2a between two demodulated symbols on the same axis of a mapping table, and outputting the calculated $Z_k$ as the soft value of the third demodulated symbol;

selecting as a third selected signal one of the soft value $Z_k$ of the third demodulated symbol and an inverted signal of the soft value $Z_k$, according to a sign bit of the quadrature-phase component $Y_k$;

selecting as a fourth selected signal one the third selected signal or a signal "0", according to a sign bit of the $Z_k$; and adding the fourth selected signal and the quadrature-phase component $Y_k$, and outputting the soft value of the fourth demodulated symbol.

10. A 16-ary QAM (Quadrature Amplitude Modulation) demodulation method for receiving an input signal $R_k(X_k, Y_k)$ comprised of a $k^{th}$ quadrature-phase component $Y_k$ and a $k^{th}$ in-phase component $X_k$, and generating soft values $\Lambda(s_{k,0}), \Lambda(s_{k,1}), \Lambda(s_{k,2})$ and $\Lambda(s_{k,3})$ for the input signal $R_k(X_k, Y_k)$ by a soft decision means, comprising the steps of:

(a) calculating a soft value $\Lambda(s_{k,2})$ of a third demodulated symbol among 4 demodulated symbols by subtracting a distance 2a between two demodulated symbols on the same axis of a mapping table from a level $|Y_k|$ of the quadrature-phase component $Y_k$;

(b) determining a soft value $\Lambda(s_{k,3})$ of a fourth demodulated symbol by calculating $Y_k+\alpha*Z_k$ using a first variable $\alpha$ determined by the soft value of the third demodulated symbol and a sign bit of the quadrature-phase component $Y_k$, where $Z_k$ is the soft value of the third demodulated symbol;

(c) calculating a soft value $\Lambda(s_{k,0})$ of a first demodulated symbol by subtracting the distance 2a from a level $|X_k|$ of the in-phase component $X_k$; and (d) determining a soft value $\Lambda(s_{k,1})$ of a second demodulated symbol by calculating $X_k+\beta*Z'_k$ using a second variable $\beta$ determined by the soft value of the first demodulated symbol and a sign bit of the in-phase component $X_k$, where $Z'_k$ is the soft value of the first demodulated symbol.

11. The 16-ary QAM demodulation method of claim 10, wherein the step (b) comprises the steps of:

setting the first variable $\alpha$ to "0" if the soft value $Z_k$ of the third demodulated symbol has a negative value;

setting the first variable $\alpha$ to "−1" if the $Z_k$ has a positive value and the quadrature-phase component $Y_k$ has a negative value; and setting the first variable $\alpha$ to "1" if the $Z_k$ has a positive value and the quadrature-phase component $Y_k$ has a positive value.

12. The 16-ary QAM demodulation method of claim 10, wherein the step (d) comprises the steps of:

setting the second variable $\beta$ to "0" if the soft value $Z'_k$ of the first demodulated symbol has a negative value;

setting the second variable $\beta$ to "−1" if the $Z'_k$ has a positive value and the in-phase component $X_k$ has a negative value; and setting the second variable $\beta$ to "1" if the $Z'_k$ has a positive value and the in-phase component $X_k$ has a positive value.

13. A method for demodulating a received signal in a data communication system employing a modulating technique for dividing an output sequence of a channel encoder into 4 bits and mapping the bits to a specific one of 16 signal points having an in-phase component $X_k$ and a quadrature-phase component $Y_k$, comprising the steps of:

calculating a soft value $Z_k$ of a third demodulated symbol by subtracting a distance 2a between two demodulated symbols on the same axis of a mapping table from a level $|Y_k|$ of the quadrature-phase component $Y_k$;

setting a first variable a to "0" if the soft value $Z_k$ has a negative value, setting the first variable $\alpha$ to "−1" if the $Z_k$ has a positive value and the quadrature-phase component $Y_k$ has a negative value, and setting the first variable $\alpha$ to "1" if the $Z_k$ has a positive value and the quadrature-phase component $Y_k$ has a positive value;

determining a soft value of fourth demodulated symbol by calculating $Y_k+\alpha*Z_k$ using the quadrature-phase component $Y_k$, the soft value $Z_k$ and the first variable $\alpha$;

calculating a soft value $Z'_k$ of a first demodulated symbol by subtracting the distance 2a between two demodulated symbols on the same axis of a mapping table from a level $|X_k|$ of the in-phase component $X_k$;

setting a second variable $\beta$ to "0" if the soft value $Z'_k$ has a negative value, setting the second variable $\beta$ to "−1" if the $Z'_k$ has a positive value and the in-phase component $X_k$ has a negative value, and setting the second variable $\beta$ to "1" if the $Z'_k$ has a positive value and the in-phase component $X_k$ has a positive value; and determining a soft value of second demodulated symbol by calculating $X_k+\beta*Z'_k$ using the in-phase component $X_k$, the soft value $Z'_k$ and the second variable $\beta$.

* * * * *